(12) United States Patent
Srivastava et al.

(10) Patent No.: US 10,915,415 B2
(45) Date of Patent: Feb. 9, 2021

(54) DEVICE, METHOD AND SYSTEM FOR PERFORMING CLOSED CHASSIS DEBUG WITH A REPEATER

(71) Applicants: INTEL CORPORATION, Santa Clara, CA (US); Amit Kumar Srivastava, Kampung Jawa Penang (MY); Huimin Chen, Portland, OR (US)

(72) Inventors: Amit Kumar Srivastava, Kampung Jawa Penang (MY); Huimin Chen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 280 days.

(21) Appl. No.: 15/776,384

(22) PCT Filed: Oct. 13, 2016

(86) PCT No.: PCT/US2016/056886
§ 371 (c)(1),
(2) Date: May 15, 2018

(87) PCT Pub. No.: WO2017/112046
PCT Pub. Date: Jun. 29, 2017

(65) Prior Publication Data
US 2020/0257601 A1   Aug. 13, 2020

(30) Foreign Application Priority Data

Dec. 25, 2015  (MY) .............................. PI2015704766

(51) Int. Cl.
*G06F 11/00* (2006.01)
*G06F 11/273* (2006.01)
(Continued)

(52) U.S. Cl.
CPC ........ *G06F 11/2733* (2013.01); *G06F 11/221* (2013.01); *G06F 13/4282* (2013.01); *G06F 2213/0042* (2013.01)

(58) Field of Classification Search
CPC ............. G06F 11/2733; G06F 11/2736; G06F 11/273; G06F 11/221; H04B 3/36
See application file for complete search history.

(56) References Cited

U.S. PATENT DOCUMENTS 8,589,881 B2   11/2013  Park et al.
9,201,831 B2 * 12/2015  Chan .................. G06F 13/4027
(Continued)

FOREIGN PATENT DOCUMENTS

WO   WO 2014004925 A1   1/2014

OTHER PUBLICATIONS

Korean IP Office—International Search Report of the International Searching Authority dated Jan. 24, 2017 for International Application No. PCT/US2016/056886 (3 pgs).
(Continued)

*Primary Examiner* — Michael Maskulinski
(74) *Attorney, Agent, or Firm* — Schwabe, Williamson & Wyatt, P.C.

(57) ABSTRACT

Techniques and mechanisms for exchanging debug information with a repeater and multiplex logic of a platform. In an embodiment, the multiplex logic can be configured to any of multiple modes including a first mode to exchange debug information between the repeater and debug client logic of the platform. Another of the multiple modes may provide an alternate communication path for exchanging functional data, other than any debug information, between the repeater and a physical layer interface of the platform. In another embodiment, the repeater is compatible with a repeater architecture identified by a universal serial bus standard. The
(Continued)

physical layer interface is compatible with an interface specification identified by the same universal bus standard.

25 Claims, 11 Drawing Sheets

(51) Int. Cl.
*G06F 11/22* (2006.01)
*G06F 13/42* (2006.01)

(56) References Cited

U.S. PATENT DOCUMENTS

| | | | | |
|---|---|---|---|---|
| 2005/0232643 | A1* | 10/2005 | Aronson | H04B 10/40 |
| | | | | 398/183 |
| 2007/0286110 | A1 | 12/2007 | Proctor, Jr. et al. | |
| 2010/0287562 | A1 | 11/2010 | Jazdzewski | |
| 2013/0151901 | A1 | 6/2013 | Swoboda | |
| 2016/0283423 | A1* | 9/2016 | Srivastava | G06F 11/3656 |
| 2016/0285757 | A1* | 9/2016 | Srivastava | H04L 12/10 |

OTHER PUBLICATIONS

Korean IP Office—Written Opinion of the International Searching Authority dated Jan. 24, 2017 for International Application No. PCT/US2016/056886 (7 pgs).
PCT/US2016/056886, International Preliminary Report and Written Opinion, dated Jul. 5, 2018, (9 pages).

* cited by examiner

DEVICE, METHOD AND SYSTEM FOR PERFORMING CLOSED CHASSIS DEBUG WITH A REPEATER

CROSS-REFERENCE TO RELATED APPLICATIONS

This patent application is a U.S. National Phase application under 35 U.S.C. § 371 of International Application No. PCT/US2016/0556886, filed on 13 Oct. 2016, entitled DEVICE, METHOD AND SYSTEM FOR PERFORMING CLOSED CHASSIS DEBUG WITH A REPEATER, which claims priority to Malaysian Patent Application No. PI2015704766 filed 25 Dec. 2015, the contents of which are incorporated by reference in their entirety.

BACKGROUND

1. Technical Field

Embodiments of the invention relate generally to debug testing and more particularly, but not exclusively, to a repeater for exchanging debug information.

2. Background Art

Existing systems—e.g., including platforms, SoCs, etc. of tablets, laptops, smart phones or the like—typically contain several components (chips, packages, etc.) that are configured to be individually debugged, where for each component, there is a respective connector for coupling the component to some debug software unit. Such components may include, for example, one or more of a modem, application processor, different chips, wireless LAN, and or the like. These components are traditionally debugged individually.

Traditionally, debug ports are designed for what is referred to "open chassis" systems that are to be debugged while a system chassis is open. In such systems, dedicated interfaces (each having a distinct connector) are used each for a different component that is to connect to a debug test system. Such debugging is usually to tune a component—e.g., to provide a modem with improved bandwidth, an application processor with improved response time, etc. Recent closed chassis technologies allow an end user to debug a system while the chassis is closed.

Although high bandwidth connectors are desirable for use in closed chassis debugging, they are typically constrained at least with respect to the allowable length of a connection between a debug unit and a platform under test. As successive generations of hardware platforms continue to trend toward fewer external input/output (I/O) ports that support higher frequency data communications, there is expected to be an increased demand for such hardware platforms to support efficient debug functionality.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
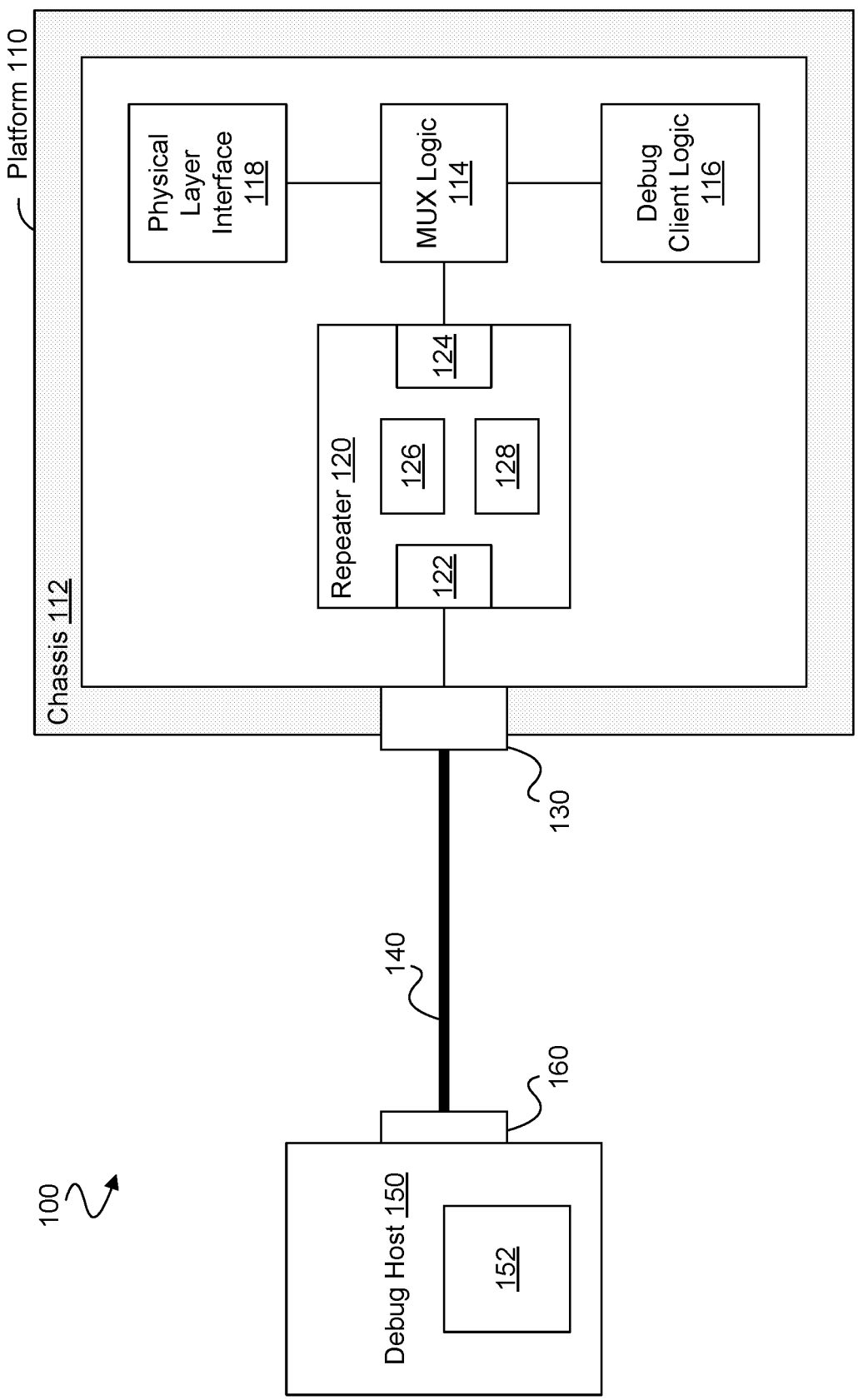
FIG. 1 is a functional block diagram illustrating elements of a system to debug a device under test according to an embodiment.

Embodiments discussed herein variously provide techniques and/or mechanisms for communicating debug information via a repeater of a platform. The repeater may be compatible with a repeater architecture that is identified by a standard such as any of a variety of universal serial bus (USB) standards. One example of such a USB standard is the embedded USB2 (eUSB2) Physical Layer Supplement to the USB Revision 2.0 Specification, published Aug. 1, 2014 by the USB Implementers Forum.

The repeater may operate in conjunction with multiplexer (MUX) logic of the platform to selectively provide, at various times, either one of a path for communication with debug logic of the platform and an alternate path for communication with a physical layer (PHY) interface of the platform. The PHY interface may enable communication by a PHY of the platform with a host of the platform. In some embodiments, the PHY includes the MUX logic. The PHY interface may be compatible, for example, with an interface specification identified by the universal bus standard. By way of illustration and not limitation, the PHY interface may be compatible with a USB transceiver macrocell interface (UTMI) specification such as the UTMI+ Specification, Revision 1.0, dated Feb. 2, 2004.

The eUSB2 Physical Layer Supplement (for brevity, referred to herein as "eUSB2") includes a description of a repeater architecture which provides for a repeater to be configured for either of two types of operation referred to, respectively, as "Top Down" operation and "Bottom Up" operation. During a Top Down (TD) configuration of a repeater, the launching of a USB session may be originated by a session controller and passed to a USB Controller (e.g., that of the a system on chip). The launching of the USB session may be relayed, in turn, by the USB Controller to a eUSB2 physical layer (PHY), which in turn provides commands to the eUSB2 repeater. By contrast, during a Bottom Up (BU) configuration, the launching of a USB Session is originated by a session controller and passed to a eUSB2 Repeater, which announces the launching to the eUSB2 PHY, which in turn signals the launching to the USB Controller. "TBConfig" is used herein to refer to a currently configured one of a TD configuration and a BU configuration. The TBConfig state of a repeater may be announced to MUX logic and/or debug logic of the platform in some embodiments—e.g., during a verification of repeater presence detection upon system power up.

In an embodiment, different communication paths are variously provided, with a repeater and MUX logic of a platform, for exchanging different respective types of information. The term "debug information" is used herein to refer to information that is to aid in processes for debugging at least some logic (including hardware, firmware and/or software) of a platform. By way of illustration and not limitation debug information may include a command to perform a debug test, software code that is to be executed to perform debugging, one or more parameters that define at least in part the performance of a debug test, an output generated by a debug test, a calculation determined based on an debug test output and/or the like.

The term "functional data" is used herein to refer to data that is distinguished from any debug information. Functional data may be any of various types of data that is not used by, generated by or otherwise a basis for performance of a debug operation. Functional data may be communicated to, from and/or within a platform during regular runtime operation thereof—e.g., while no debug processes are being performed by the platform. As used herein, the term "functional" also refers to certain mechanisms or functionalities that aid in the communication of functional data. For example, "functional interface" may refer to a PHY interface that exchanges functional data—e.g., where the functional interface does not also exchange debug information.

Some embodiments are described herein in relation to a repeater that is compatible with a repeater architecture of a eUSB2 standard. Some embodiments are more particularly described herein with reference to the communication of debug information using a Boundary Scan Sideband (BSSB) interface protocol developed by Intel Corporation of Santa Clara, Calif. However, such description may be extended to apply to any of a variety of additionally or alternatively combinations of a serial bus standard standards and an interface protocol according to different embodiments. Although some embodiments are described herein with reference to closed chassis debug operations, other embodiments may be performed to debug a platform while it is in an open chassis configuration.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies may be employed in any of a variety of electronic devices including a repeater, multiplex logic and debug client logic as described herein.

FIG. 1 illustrates elements of a system 100 to perform debug processing according to an embodiment. System 100 is one example of an embodiment that supports closed chassis (or other) debugging of a platform that includes a repeater—e.g., where the repeater is compatible with a repeater architecture identified in a universal serial bus standard. At different times, the repeater may variously participate in different ones of a debug information exchange and a functional information exchange. The platform—or one or more components thereof—may be variously configured in any of different modes including a first (debug) mode and a second (functional) mode. The configuration of a particular one of the modes may determine a source from which information (functional or debug) is to be received by the repeater and/or a sink to which such information is to be sent by the repeater.

As shown in FIG. 1, system 100 may include a platform 110 and a debug host 150, where respective connectors 130, 160 thereof are coupled to one another via an interconnect 140. Platform 110 may include, or function as a component of, a computer (e.g., a server, desktop computer, laptop computer, tablet or the like), smart phone or any of a variety of other hardware systems. Debug host 150 may include logic 152—comprising hardware, firmware and/or executing software—that is to direct communications and/or other operations in aid of debugging at least some circuitry of platform 110. Although some embodiments are not limited in this regard, debugging of platform 110 may be performed while a chassis 112 thereof remains in a closed configuration—e.g., where multiple components located in an interior of platform 110 are debugged via the input/output (IO) connector 130 that provides for communication through chassis 112.

Debug operations may include or otherwise be based at least in part on exchanges between debug host 150 and a repeater 120 of platform 110. In the illustrative embodiment shown, repeater 120 includes interfaces 122, 124 coupled, respectively, to connector 130 and to multiplex (MUX) logic 114 of platform 110. MUX logic 114 may be variously configured, at different times, in different ones of a plurality of modes including, for example, a first mode that provides a communication path between repeater 120 and debug client logic 116 of platform 116. Alternatively or in addition, such a plurality of modes may include a second mode that instead provides a communication path between repeater 120 and a physical layer (PHY) interface 118 of platform 110. Physical layer interface 118 may interface a PHY of platform 110 with a protocol layer (not shown) of platform 110. In such an embodiment, the PHY of platform 110 may include MUX logic 114, for example.

Logic 128 of repeater 120 may variously facilitate exchanges of information between interfaces 122, 124. The relaying by logic 128 may enable an exchange of debug information between debug host 150 and debug client logic 116. Such debug information may include, for example, one or more of debug code, debug control commands, debug output data, etc. Some or all of such debug data may be based, for example, on conventional platform debug techniques, which are not limiting on some embodiments and are not detailed herein to void obscuring certain features of various embodiments. In an embodiment, exchanges of debug information via repeater 120 and MUX logic 114 enables control of debug client logic 116 by logic 152—e.g., where logic 152 manages one or more debug operations by debug client logic 116 using mechanisms adapted from conventional debug host/client techniques.

Additionally or alternatively, relaying by logic 128 may enable an exchange of functional data (other than any debug information) with physical layer interface 118. Such an exchange may take place during a functional (or "operational") mode of platform 110. In this context, "functional" ("operational") refers to general-purpose, runtime mode of platform 100—when no debugging of platform 110 is taking place. Repeater 120 may be compatible with a repeater architecture described or otherwise identified, for example, by eUSB2 or other such universal serial bus standard. In such an embodiment, physical layer interface 118 may be compatible with an interface specification—e.g., UTMI+—that is also identified by the same universal bus standard.

Relaying of information by logic 128 may include one or more operations to variously process signals representing such information. By way of illustration and not limitation, interface 122 may be coupled to exchange signals according to one serial bus standard, where interface 124 is coupled to instead exchange signals according to another serial bus standard. The two serial bus standards may provide for signals having different respective end-to-end timing requirements, voltage levels and/or other characteristics. In an illustrative scenario according to one embodiment, interface 124 may be coupled to MUX logic 114 via a pair of wires eD+/eD− that are configured to exchange differential data signals, according to an eUSB2 standard, that has a 1 Volt (V) signaling range. By contrast, interface 122 may be coupled to connector 130 via a pair of wires D+/D− that are configured to exchange differential data signals, according to a USB2 standard, which has a 3.3 V signaling range (or a 400 mV range, in another embodiment). In such an embodiment, logic 128 may provide for conversion between the respective signaling ranges of such the pairs of wires eD+/eD− and D+/D−. Any of a variety of additional or alternative signal processing may be provided by repeater 120 to relay information, according to different embodiments.

In an embodiment, repeater 120 further comprises, or couples to, a detector 126 coupled to determine whether (or not) a debug session is to take place. For example, repeater 120 may receive signaling via connector 130, where detector 126 performs pattern recognition processing to determine whether a debug command, debug code or other debug information is included in or otherwise indicated by such signaling. In response to detector 126 determining that a debug session is indicated, repeater 120 may generate a signal that, directly or indirectly, determines a multiplexing mode of MUX logic 114. In some embodiments, repeater 120 foregoes and such signaling—e.g., where MUX logic 114 is already in a state (e.g., a default state) that is to facilitate a debug mode of platform 110.

Figure 2:
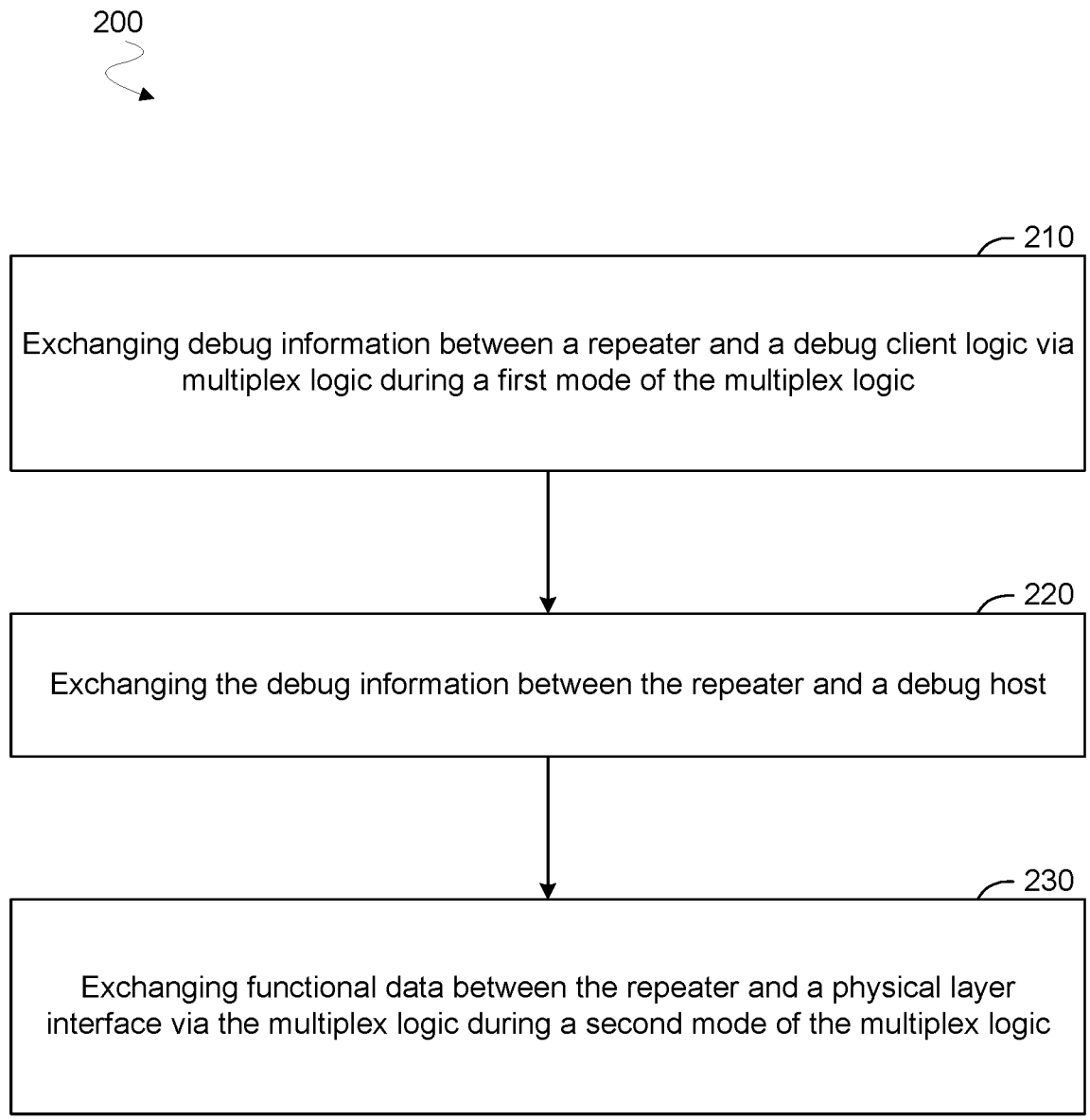
FIG. 2 is a flow diagram illustrating elements of a method to debug a device according to an embodiment.

FIG. 2 illustrates elements a method 200 to perform debugging of a platform according to an embodiment. Method 200 is one example of an embodiment that may facilitate debugging operations using a repeater that is compatible, for example, with a repeater architecture specification of an eUSB2 standard. Performance of method 200 may include operations by repeater 120, for example. Some embodiments further comprise additional operations performed by one or more other platform components that are coupled to such a repeater. Still other embodiments additionally or alternatively include performing corresponding operations at a debug host that is to debug the platform using the repeater.

Method 200 may include, at 210, exchanging debug information between a repeater of a platform and a debug client logic of the platform. The repeater may be compatible with a repeater architecture that is described, referenced or otherwise identified by a universal serial bus standard. The debug information may be exchanged at 210 via multiplex logic of the platform during a first mode of the multiplex logic. Although some embodiments are not limited in this regard, the first mode may be configured by the repeater—e.g., in response to the repeater detecting signaling, from a debug host, which commands or otherwise indicates that a debug session is to be performed.

In an embodiment, method 200 further comprises, at 220, exchanging the debug information between the repeater and a debug host that is coupled to the platform. The respective exchanging at 210 and at 220 may facilitate communication between the debug host and the debug client logic—e.g., for debug host to load debug code, command execution of debug processes, pass parameters and/or other values to determine execution of debug processes, retrieve a result of debug processes and/or the like.

Although some embodiments are not limited in this regard, method 200 may further include, at 230, exchanging functional data between the repeater and a physical layer interface of the platform. The functional data (e.g., other than any debug data) may be exchanged at 230 via the multiplex logic during a second mode of the multiplex logic. For example, a plurality of modes of the multiplex logic may include the first mode and the second mode, where the first mode is to provide a communication path between the repeater and the debug client logic. In such an embodiment, the second mode may provide an alternative communication path between the repeater and the physical layer interface. The physical layer interface may be compatible with an interface specification that identified by a universal bus standard—e.g., where the repeater is compatible with a repeater architecture identified by the same universal serial bus standard.

Figure 3:
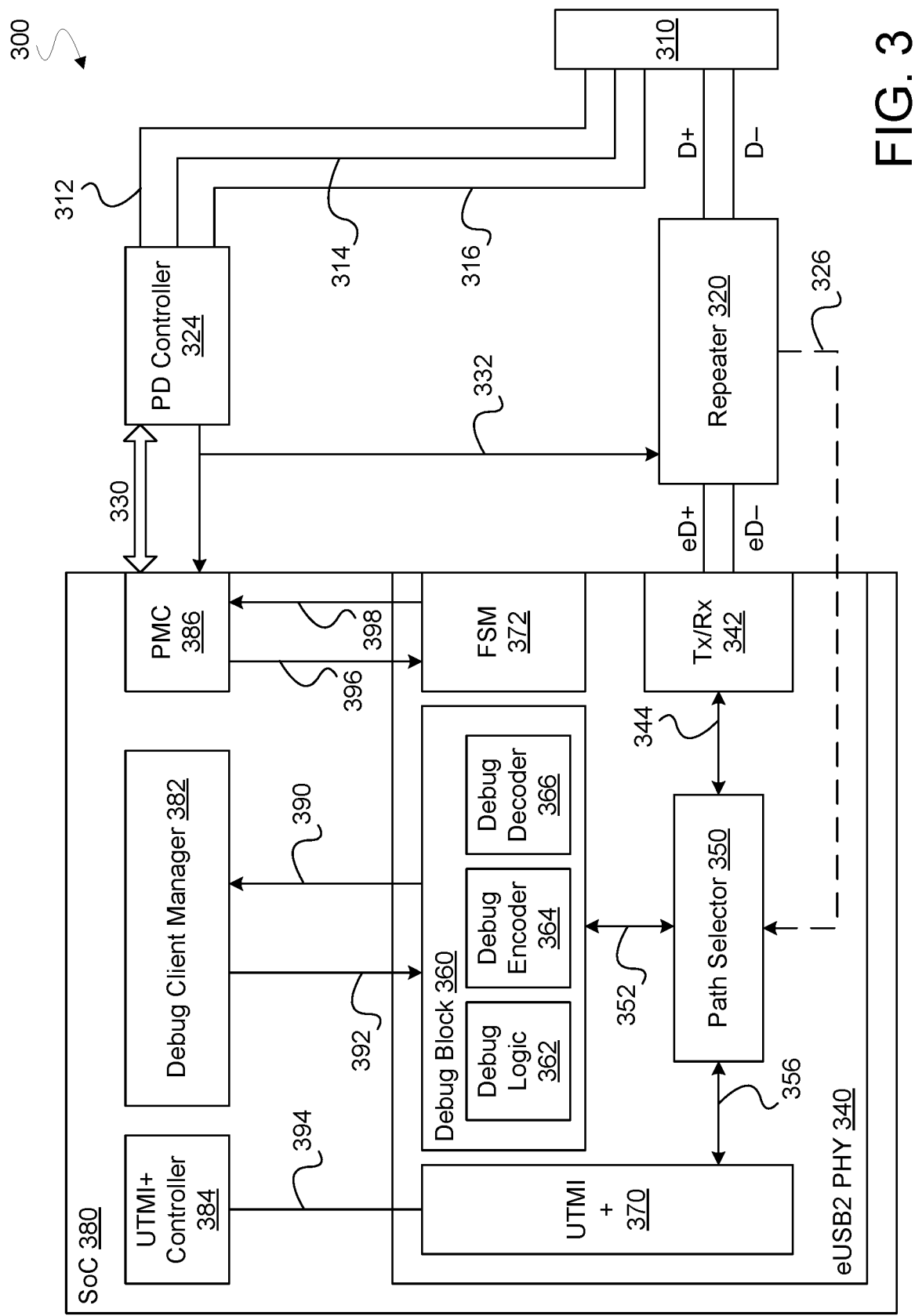
FIG. 3 is a functional block diagram illustrating elements of a device to be evaluated based on debug information exchanged according to an embodiment.

FIG. 3 illustrates elements a device 300 to facilitate debug operations according to an embodiment. Device 300 is one example of a hardware platform that is variously configurable to facilitate, at different times, either one of an exchange of debug information and an exchange of functional data (where either exchange uses a repeater and multiplex circuitry). Device 300 may include some or all features of platform 110, for example. In some embodiments, one or more operations of method 200 are performed at device 300.

In the illustrative embodiment shown, device 300 includes a connector 310 (e.g., connector 130) to facilitate coupling of device 300 to a remote debug host (not shown), for example. When not coupled to such a debug host, connector 130 may be available to instead couple device 300 to any of a variety of other peripherals, platforms etc. (e.g., a speaker, microphone, memory stick, computer, smart phone, tablet, or the like)—e.g., for an exchange of functional data. A repeater 320 of device 300 may be coupled between connector 310 and a physical layer, such as the illustrative eUSB2 PHY 340. Repeater 320 may be compatible with a repeater architecture that is specified or otherwise indicated, for example, in an eUSB2 standard.

The eUSB PHY 340 may provide physical layer functionality that enables communication with platform host logic of device 300, such as that of the illustrative system-on-chip (SoC) 380. SoC 380 is merely one example of circuit logic—e.g., comprising a processor, controller, memory, platform controller hub, one or more buses, and/or the like—to support either one of debug processes and functional mode operations (other than any such debug processes). However, certain embodiments are not limited to operation by or with a SoC, and various alternative platform host circuitry may be used, in different embodiments. For example, eUSB PHY 340 and/or other logic of SoC 380 may, in other embodiments, be implemented in any of a variety different combinations of IC chips—e.g., including IC chips of different respective packaged devices.

In an embodiment, eUSB2 PHY 340 includes multiplex logic—represented by the illustrative path selector 350— that selectively exchanges signals along different respective paths. For example, different modes of path selector 350 may be variously configured based on a signal 326 from repeater 320, where each mode corresponds to a respective signal path through path selector 350. Repeater 320 may be coupled to exchange with a transceiver (Tx/Rx) 342 of eUSB2 PHY 340 a pair of differential signals eD+/eD− according to a eUSB2 standard. Tx/Rx 342 may exchange, between path selector 350 and repeater 320, signals 344 representing information exchanged (or to be exchanged) via eD+/eD−. In such an embodiment, repeater 320 may be further coupled to exchange with connector 310 a corresponding pair of differential signals D+/D−—e.g., according to a USB2 standard.

One path provided by path selector 350 may facilitate communication of functional data with a PHY interface, such as the illustrative UTMI signals 356 exchanged between path selector 350 and a UTMI+ 370 of eUSB2PHY 340. UTMI signals 356 may represent information that is exchanged (or is to be exchanged) as signals 394 between UTMI+ 370 and host side logic such as the illustrative UTMI+ controller 384 of SoC 380. UTMI+ controller 384 is one example of logic (e.g., including hardware and/or executing software) that, as compared to UTMI+ 370, is higher in a protocol stack. For example, UTMI+ controller 384 may facilitate communication between UTMI+ 370 and a host processor (not shown) of SoC 380.

An alternative path provided by path selector 350 may facilitate communication of debug information with debug client logic of device 300. Such debug client logic may include, for example, a debug client manager 382 of SoC 380. Debug manager 382 may provide functionality to participate in debug exchanges using eUSB2 PHY 340. In an illustrative scenario according to one embodiment, debug manager 382 performs operations to validate repeater 320 and/or a debug host coupled via repeater 320. Upon performing such validation, debug manager 382 may perform operations, on behalf of a debut host, to debug at least some logic of device 300. For example, such operations may include receiving debug code, servicing debug commands, determining a result of a debug process, providing debug report information and/or the like. Such operations may variously result in and/or be based on debug information that is exchanged with path selector 350—e.g., via a debug block 360 of eUSB2 PHY 340.

Debug block 360 is one example of circuitry that provides PHY level processing of debug information. For example, debug block 360 may include debug logic 362 to facilitate an exchange of debug information according to a Boundary Scan Sideband (BSSB) interface protocol. In one embodiment, debug logic 362 coordinates encoding and/or decoding of blocks of debug information. For example, debug block 360 may further comprise a debug encoder 364 and a debug decoder 366, one or both of which are controlled by debug logic 362. Debug encoder 364 may receive information from debug client manager 382, and perform BSSB encoding of such information to generate data blocks that are then sent to repeater 320 via path selector 350 and Tx/Rx 342. Alternatively or in addition, debug decoder 366 may perform BSSB decoding of data blocks that are received from repeater 320 via path selector 350 and Tx/Rx 342. Information of such decoded BSSB blocks may in turn be sent to debug client manager 382. In the illustrative embodiment shown, signals 352 include BSSB communications variously exchanged between debug block 360 and path selector 350, where signals 390, 392 include exchanges of corresponding debug information between debug block 360 and debug client manager 382.

Although some embodiments are not limited in this regard, device 300 may provide additional functionality in support of functional data exchanges and/or debug information exchanges using repeater 320. For example, such exchanges may be facilitated in part by exchanges between a finite state machine (FSM) 372 of eUSB2 PHY 340 and a power management controller (PMC) 386 of SoC 380. FSM 372 may operate—e.g., according to a USB2 standard—to regulate power use by eUSB2 PHY 340 responsive to a power management control signal 396 from PMC 386. FSM 372 may further send one or more signals 398 to PMC 386—e.g., to request a power level, to indicate a power state of eUSB2 PBY 340 and/or the like.

Alternatively or in addition, PMC 386 may be coupled to a power delivery (PD) controller 324 of device 300. PD controller 324 and connector 310 may be coupled to exchange a supply voltage Vbus 312 and, in some embodiment, a CC1 signal 314 and CC2 signal 316 of a control/configuration channel for operation with a USB type-C connector (not shown) that may couple to connector 310. PD controller 324 may exchange power and/or power state information with PMC 386—e.g., using an I$^2$C interface 330 (or any of various other types of interfaces). In some embodiments, PD controller 324 determines—e.g., based on signals 314, 316, a type of connector coupled to connector 310. In response, PD controller 324 may output a signal 332 indicating the connector type to repeater 320 and/or to PMC 386.

Figure 4:
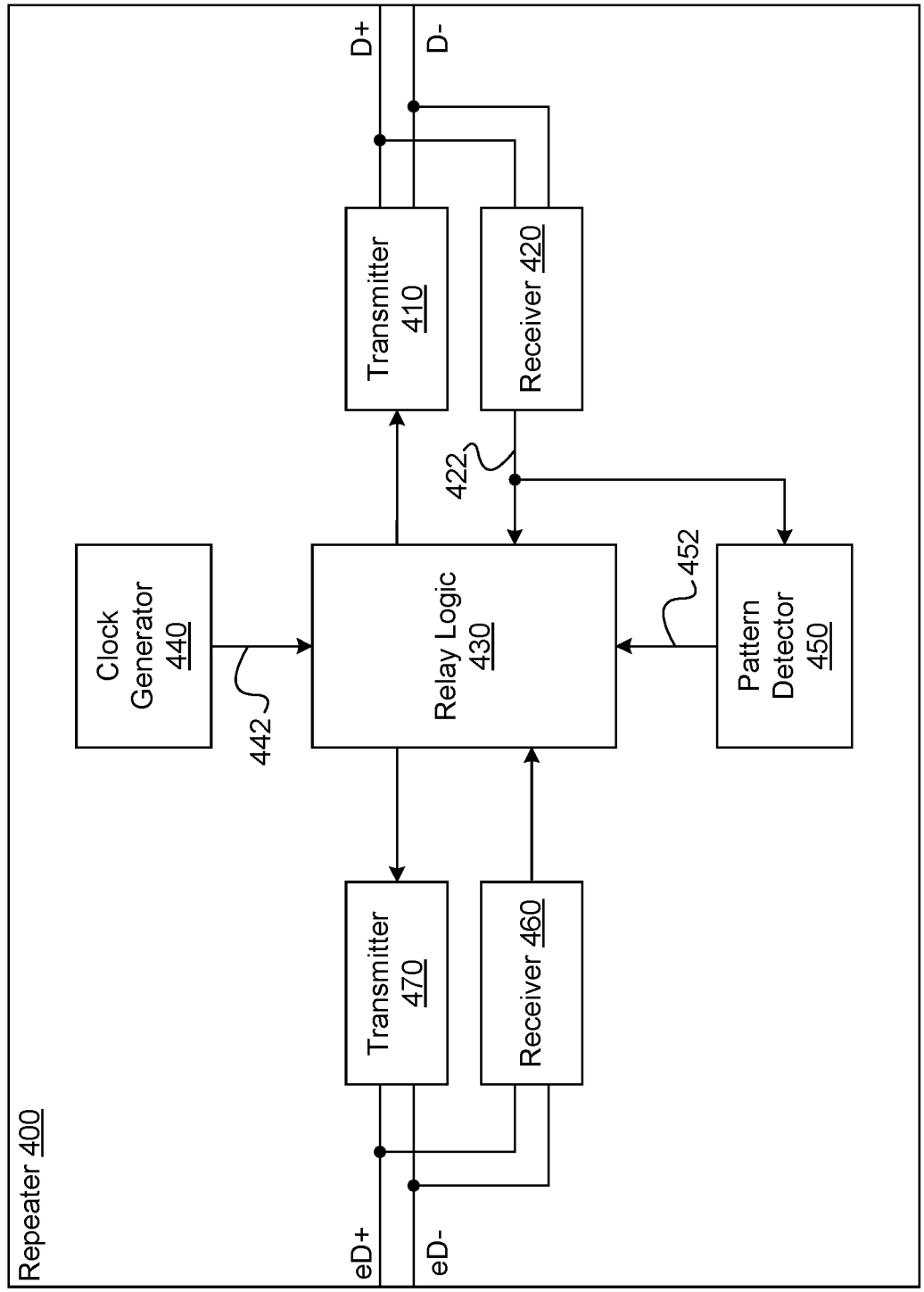
FIG. 4 is a functional block diagram illustrating elements of a repeater to exchange debug information according to an embodiment.

FIG. 4 illustrates features of a repeater 400 to exchange debug information according to an embodiment. Repeater 400 may provide functionality of one of repeaters 120, 320, for example. In an embodiment, repeater 400 is configured to perform some or all of method 200. Repeater 400 is one example of a device, according to an embodiment, that includes interfaces to variously exchange signals each according to a different respective standard. One such standard may include describe, cite or otherwise identify a repeater architecture with which repeater 400 is compatible.

In the illustrative embodiment shown, a first interface of repeater 400 includes transceiver circuitry—represented by the illustrative transmitter 410 and receiver 420—to couple repeater 400 to signal lines D+/D− for exchanging a differential signal pair. For example, transmitter 410 and receiver 420 may variously transmit and receive signals via D+/D− according to a USB2 standard. Alternatively or in addition, transceiver circuitry of a second interface at repeater 400 may include a transmitter 470 and a receiver 460. The second interface may be coupled to signal lines eD+/eD− that are for exchanging another differential signal pair—e.g., according to an eUSB2 standard.

Relay logic 430 of repeater 400 may be coupled between the two interfaces, where relay logic 430 is to perform signal amplification, signal biasing and/or otherwise facilitate a conversion between signaling each according to different respective one of the two standards. Using transmitter 410, 470, repeater 400 may variously redrive signals each along a corresponding one of the signal wire pairs D+/D− and eD+/eD−. The redriving of such signals may be coordinated with a clock signal 442 provided by a clock generator 440 that is included in (or alternatively, coupled to) repeater 400.

In some embodiments, repeater 400 includes or couples to circuitry that identifies whether debug information is to be exchanged between the signal wire pairs D+/D− and eD+/eD. For example, repeater 400 may further comprise a pattern detector 450 (e.g. detector 126) to sample at least some portion of a signal 422 output from receiver 420. The sampled portion may include, for example, one or more values (provided by a debug host) which are predetermined to be an indicator that a debug session is to be performed. In response to identifying the one or more values, pattern detector 450 may output a signal 452—e.g., to relay logic 430—specifying or otherwise indicating the multiplex logic (not shown) is to be configured for providing a communication path for exchanging debug information.

Figure 5A:
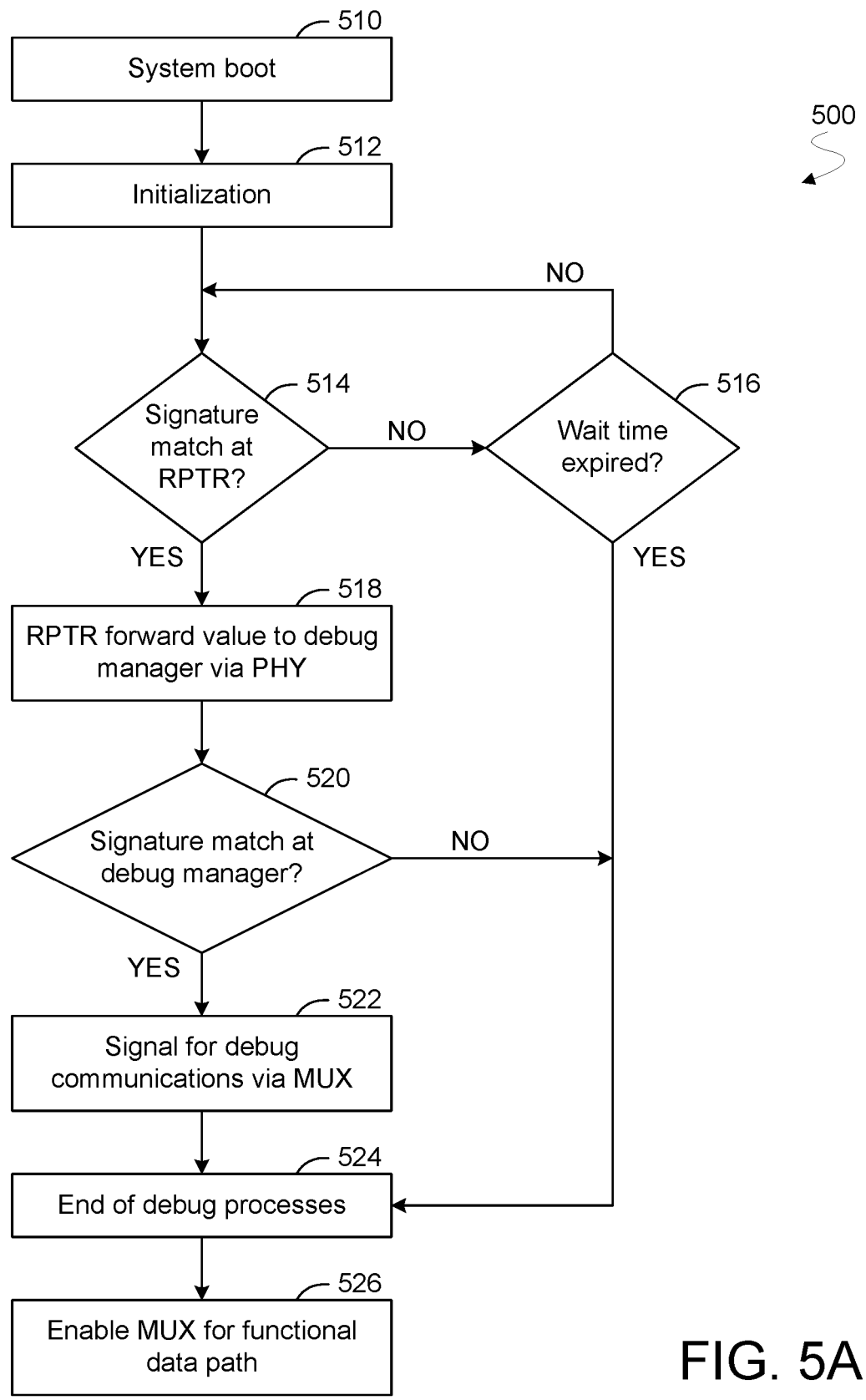
FIG. 5A-5C are flow diagrams illustrating respective methods for operating devices each to be evaluated based on debug information exchanged according to a corresponding embodiment.

FIG. 5A illustrates operations of a method 500 to communicate debug information according to an embodiment. Method 500 is one example of an embodiment that, for example, includes some or all operations of method 200. In an embodiment, method 500 comprises, at 510, performing a boot up of a system such as platform 110 or device 300. During or after the boot up at 510, method 500 may further perform an initialization, at 512, of components of the system—e.g., where such components include a repeater (RPTR), a PHY and a debug manager. At some point, the system performing method 500 may be coupled to a debug host that is to perform debug operations. Such a debug host may communicate to the system an indication that debug information is to be exchanged with the debug manager. For example, method 500 may include, at 514, the repeater determining whether any value has been received from the debug host, where the value that matches some predetermined reference information (e.g., a signature for authentication of the debug host). If no such matching value has been received, then method 500 may repeat the determining at 514 until the signature is matched or until, at 516, some threshold maximum wait time has been exceeded. In an embodiment, method 500 foregoes any subsequent exchange of debug information—and proceeds to block 524—if the wait time expires.

In response to the repeater determining at 514 that the signature has been matched, method 500 may forward the value to the debug manager (e.g., debug client manager 382) via the PHY. The forwarding at 518 may include sending the value via a multiplexer (MUX) of the PHY while the MUX is configured to exchange debug information. Such a configuration of the MUX may be a default configuration after the system boot at 510 and initialization at 512. The debug manager may also determine, at 520, whether the forwarded value matches the signature (or otherwise corresponds to some other predetermined reference information). If the debug manager cannot authenticate the value which was forwarded at 518, method 500 may forego any subsequent exchange of debug information, and proceed to block 524. However, if the value is also matched by the debug manager at 520, method 500 may, at 522, signal via the MUX of the PHY that an exchange of debug information may be performed. After debug processes are completed, at 524, method 500 may transition the MUX to an alternate mode that, instead of facilitating an exchange of debug information between the repeater and the debug manager, enables an exchange, at 526, of functional data between the repeater and a PHY interface.

Figure 5B:
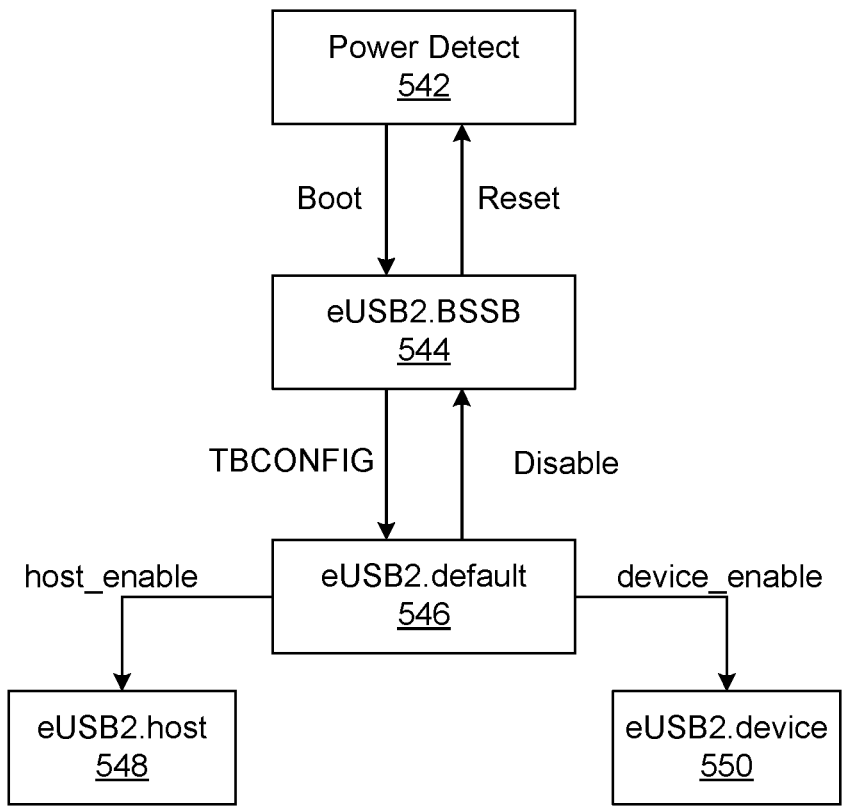

FIG. 5B illustrates operations of a method 540, according to an embodiment, to variously configure a system for either one of an exchange of debug information and an exchange of functional data. Method 540 may be performed by platform 110 or device 300, for example. In an embodiment, method 540 includes, or is part of, one of methods 200, 500.

Method 540 may include, at 542, detecting a power state transition, such as a boot up or other power on event, by the platform at which method 500 is performed. In response to the detecting at 542, method 540 may place an eUSB2 PHY of the platform into a mode 544 (represented as eUSB2.BSSB) that is to facilitate BSSB communications between the eUSB2 PHY and debug client logic of the system. Accordingly, eUSB2.BSSB mode 544 may be a default mode of the eUSB2 PHY. In some embodiments, the eUSB2 PHY may transition from the eUSB2.BSSB mode in response to a system Reset event.

The eUSB2 PHY may remain in the eUSB2.BSSB mode 544 until such time as an exchange of debug information has been completed—e.g., where the debug information is exchanged via a MUX of the eUSB2 PHY and via repeater according to techniques described herein. Transitioning the eUSB2 PHY from the eUSB2.BSSB mode 544 may be performed in response to a signal TBCONFIG from the repeater. The signal TBCONFIG may identify, according to an eUB S2 standard, whether the repeater is configured for Top Down operation or for Bottom Up operation. In response to the TBCONFIG signal, the eUSB2 PHY may be placed in a mode, eUSB2.default 546, for exchanging functional data. A transition of eUSB2 PHY back to eUSB2.BSSB 544 may be initiated by a Disable signal that, for example, is sent by a host process of the system.

Although some embodiments are not limited in this regard, the PHY may transition from eUSB2.default 546 to either one of two other modes—eUSB2.host 548 and eUSB2.device 550—each in response to a respective one of two signals (host_enable and device_enable) from the repeater. The mode eUSB2.host 548 may enable the system to control a session for a USB host. Alternatively or in addition, the mode eUSB2.device 550 may enable the system to control a session for a USB peripheral.

Figure 5C:
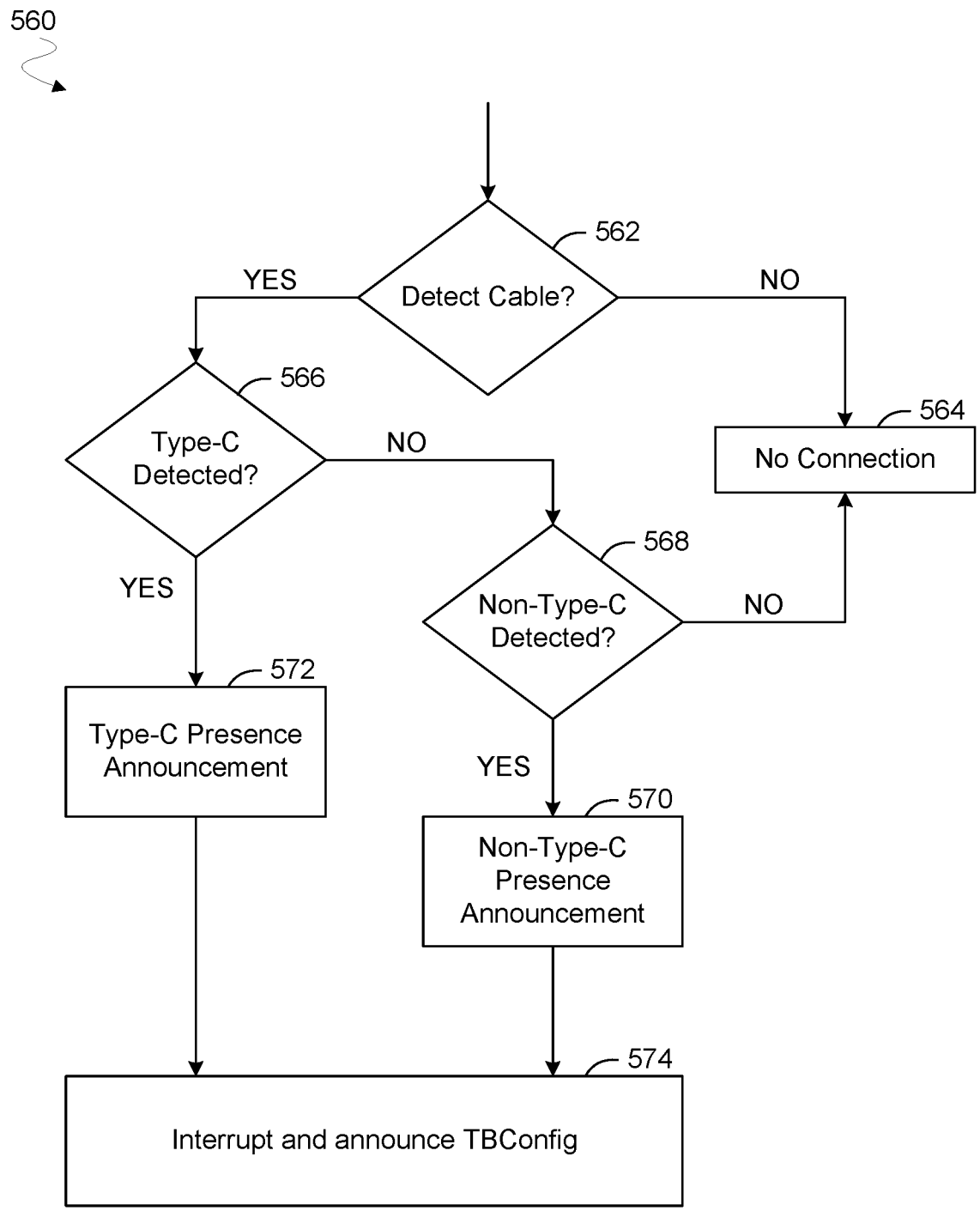

FIG. 5C shows operations of a method 560, according to an embodiment, to variously configure a system for either one of an exchange of debug information and an exchange of functional data. Method 560 may be performed by platform 110 or device 300, for example. In an embodiment, method 560 includes, or is part of, one of methods 200, 500.

Method 560 may include determining, at 562, whether a cable is coupled to a connector (e.g., one of connectors 130, 310) of the platform. In some embodiments, method 500 ends at 564 if no such cable is detected at 562. If a cable is detected at 562, then method 500 may determine, at 566, whether the cable includes Type-C™ connector hardware. If Type-C™ connector hardware is not detected at 566, then it may be determined, at 568, whether the cable includes non-Type-C™ connector hardware—e.g., whether the connector hardware (although not Type-C™) is nevertheless supported by the platform performing method 560. If the cable does not include a supported non-Type-C™ connector hardware, then method 500 may end at 564.

If, on the other hand, Type-C™ connector hardware is detected at 566, then method 500 may generate, at 570, a signal announcing a presence of the Type-C™ connector hardware. Similarly, a signal announcing the presence of the non-Type-C™ connector hardware may be generated at 570 if supported, non-Type-C™ connector hardware is detected at 568. In one illustrative embodiment, the various determining at 562, 566 and 568 may include PD controller 324 evaluating a connector hardware type—e.g., based on exchanges of C1, C2 signals via the connector. In such an embodiment, the announcing at 570 or at 572 may include PD controller 324 identifying a connector type to repeater 320 (for example). Method 560 may further comprise, at 574, generating an interrupt and announcing a TBConfig status of the repeater—i.e., whether the repeater is configured for Top Down operation or for Bottom Up operation. In one illustrative embodiment, the TBConfig status of the repeater is announced at 574 with the TBCONFIG signal that transitions an eUSB2 PHY to eUSB2.default mode 546.

Figure 6A:
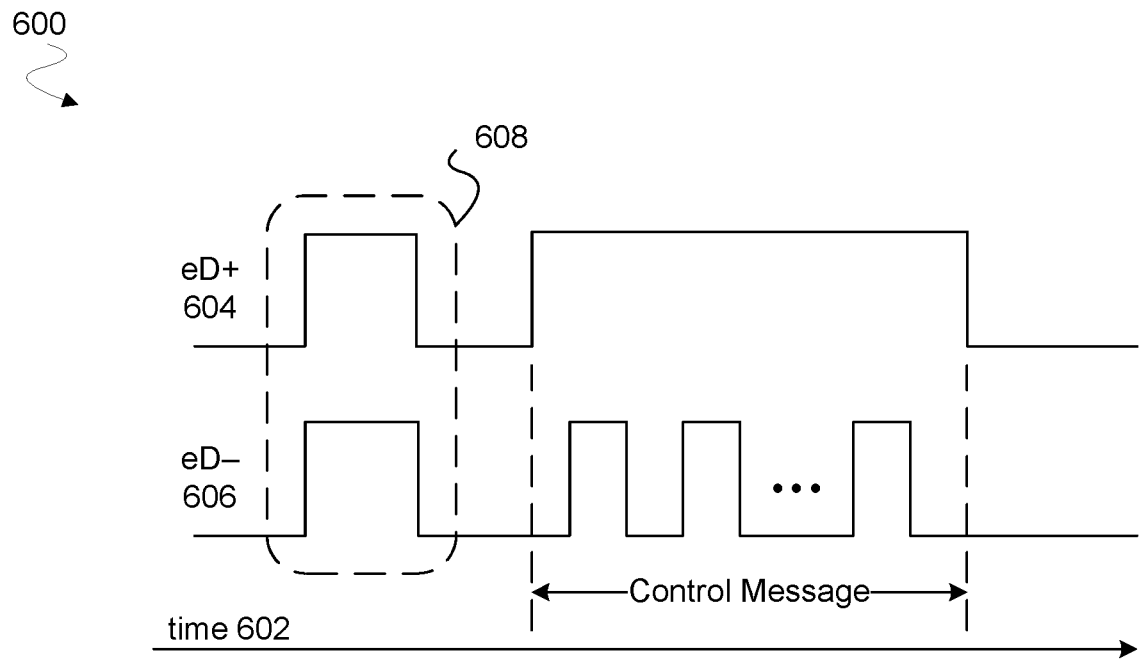
FIG. 6A, 6B are timing diagram each illustrating signals for respective debug processes each according to a corresponding embodiment.

FIG. 6A shows a timing diagram 600 illustrating an exchange of signals to configure an exchange of debug information according to an embodiment. Timing diagram 600 is one example of signals that may aid in configuring a mode of a PHY, where the mode provides a communication path between the repeater and logic which supports BSSB communications. By way of illustration and not limitation, such signals may be exchanged, for example, between repeater 320 and eUSB2 PHY 340.

As shown in timing diagram 600, signals exchanged over a period of time 602 may include signals eD+ 604 and eD− 606 to indicate an operational mode or other functionality that is to be implemented with the PHY. For example, the PHY may be configured to recognize concurrent pulses 608 of eD+ 604 and eD− 606 as being a precursor to a control message identifying a particular mode/functionality to be implemented. At a different time, the signals eD+ 604, eD− 606 may instead function as different respective signals of a differential signal pair, for example.

As shown in timing diagram 600 and table 610, a control message may include pulses of a signal—e.g., eD− 606—which follow the concurrent pulses 608. A total number of the pulses may correspond to a mode/functionality being communicated by the control message. In the embodiment illustrated by table 610, fourteen (14) pulses of eD− 606 may be recognized by the PHY as indicating that a BSSB mode of the PHY is to be implemented. In response, MUX logic of the PHY may be configured to provide a path between the repeater and client debog logic.

Figure 6B:
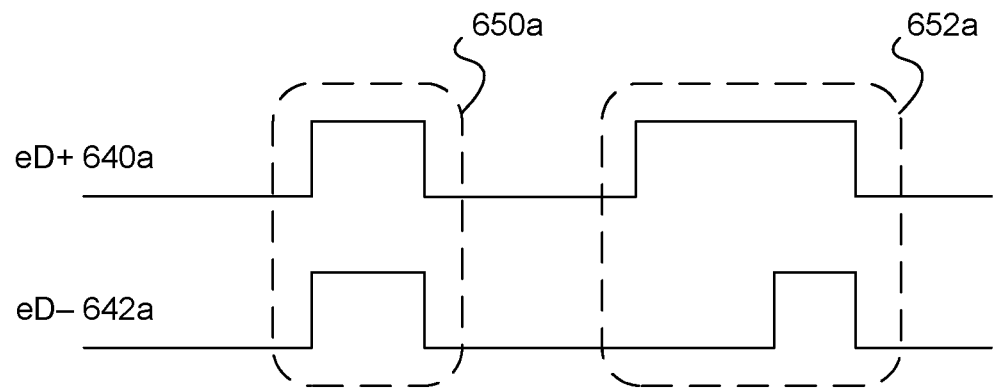
Figure 6B:
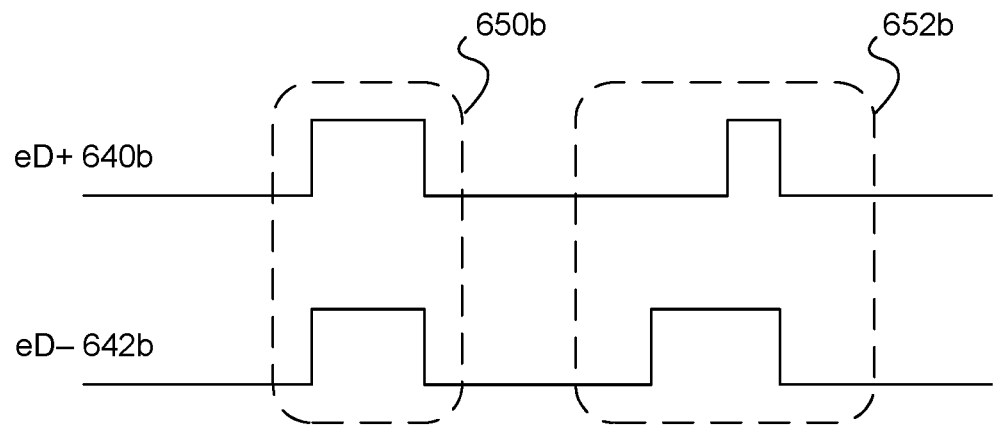

FIG. 6B shows a timing diagram 620 illustrating another exchange of signals according to an embodiment. Timing diagram 620 is one example of signals that may aid in communicating to a PHY a TBConfig status of a repeater. By way of illustration and not limitation, such signals may be exchanged, for example, between repeater 320 and eUSB2 PHY 340. The PHY may be configured to recognize a TBConfig status announcement in response to certain conditions including, for example, an enabled state of the PHY and an enabled state of the repeater. Such states may be provided, for example, in response to a PHY enable signal SOC_PH_en 630 and in response to a repeater enable signal Rpt_en 632 (e.g., from a SoC of the system).

Recognition of the TBConfig status announcement may be further in response to one or more conditions including, for example, concurrent pulses of signals from the repeater. The PHY may be coupled, for example, to receive signals eD+ 640a, eD− 642a (e.g., having some or all of the features of eD+ 604, eD− 606). The PHY may be configured to recognize concurrent pulses 650a of eD+ 640a, eD− 642a as being a precursor to a time period 652a during which eD+ 640a, eD− 642a communicate a TBConfig status of the repeater. In an illustrative scenario according to one embodiment, a rising edge of eD+ 640a may occur before a rising edge of eD− 642a during time period 652a. The PHY may be preconfigured to interpret this particular sequence of signal edges as indicating the repeater is configured for Top Down operation.

By contrast, in another scenario, the PHY may instead be coupled to receive signals eD+ 640b, eD− 642b, where the PHY is configured to recognize concurrent pulses 650b of eD+ 640b, eD− 642b as being a precursor to a time period 652b during which a TBConfig status is communicated. In time period 652b, a rising edge of eD+ 640a may occur after a rising edge of eD− 642a, indicating that the repeater is instead configured for Bottom Up operation.

Figure 7:
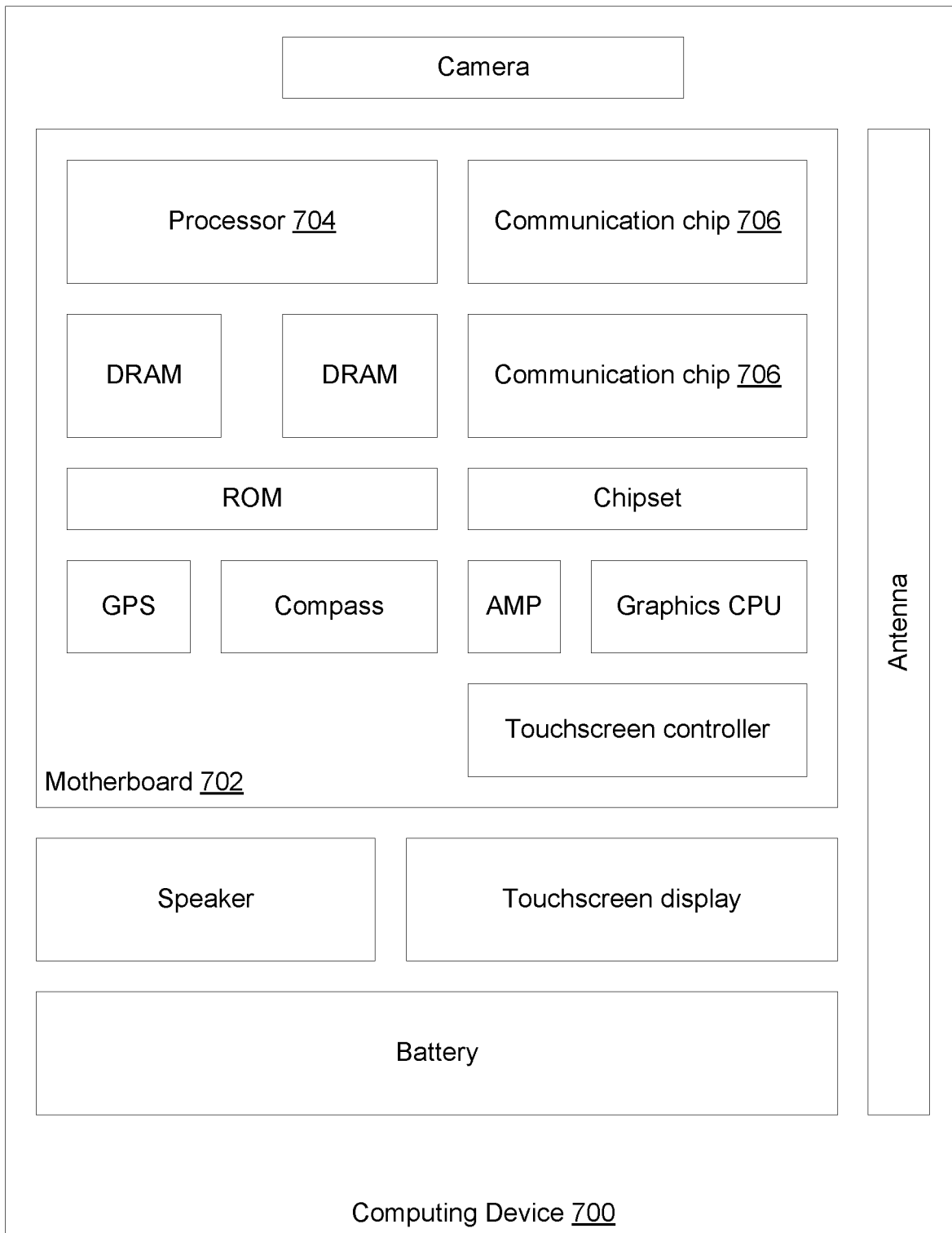
FIG. 7 is a functional block diagram illustrating a computing device in accordance with one embodiment.

FIG. 7 illustrates a computing device 700 in accordance with one embodiment. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. The term "processor" may refer to any device or portion of a device that processes electronic data from registers and/or memory to transform that electronic data into other electronic data that may be stored in registers and/or memory. The communication chip 706 also includes an integrated circuit die packaged within the communication chip 706.

In various implementations, the computing device 700 may be a laptop, a netbook, a notebook, an ultra book, a smartphone, a tablet, a personal digital assistant (PDA), an ultra-mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 8:
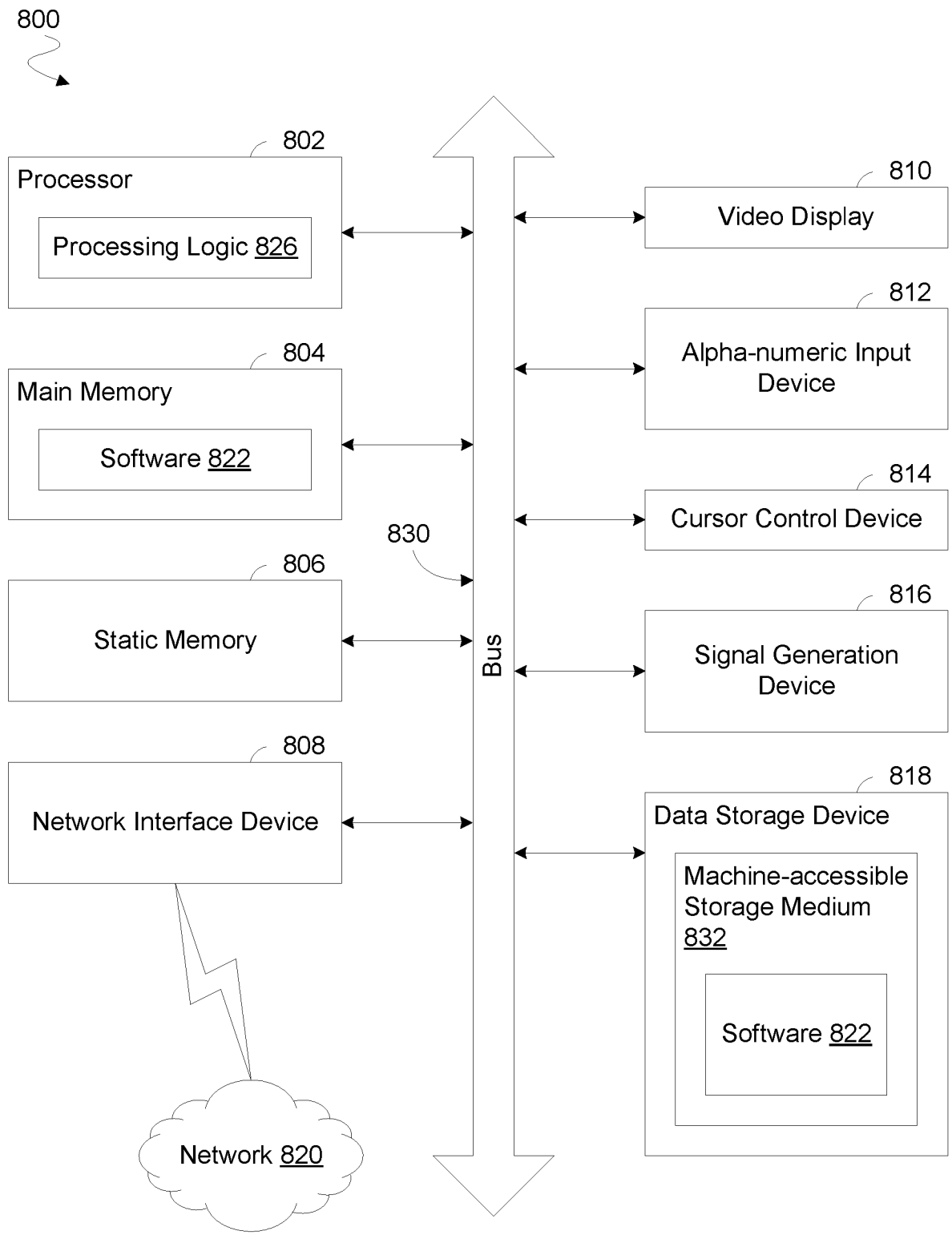
FIG. 8 is a functional block diagram illustrating features of an exemplary computer system, in accordance with one embodiment.

FIG. 8 illustrates a diagrammatic representation of a machine in the exemplary form of a computer system 800 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations described herein.

The computer system 800 may further include a network interface device 808. The computer system 800 also may include a video display unit 810 (e.g., a liquid crystal display (LCD), a light emitting diode display (LED), or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium (or more specifically a computer-readable storage medium) 832 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface device 808.

While the machine-accessible storage medium 832 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

In one implementation, a repeater device comprises a first interface configured to couple the repeater device to multiplex logic of a platform, a second interface configured to couple the repeater device to an input/output (IO) connector of the platform, and relay logic comprising circuitry configured to operate as a component of the platform, including the relay logic to exchange debug information with debug client logic of the platform via the multiplex logic during a first mode of the multiplex logic, to further exchange the debug information with a debug host coupled to the platform via the IO connector, and to exchange functional data with a physical layer interface of the platform via the multiplex logic during a second mode of the multiplex logic. The repeater device is compatible with a repeater architecture identified by a universal serial bus standard, wherein the physical layer interface is compatible with an interface specification identified by the universal bus standard.

In one embodiment, the repeater to exchange the debug information with the debug host includes the repeater to receive from the debug host an indication of a debug session, wherein the repeater comprises a pattern detector to determine, based on the indication, that the repeater is to communicate with the multiplex logic during the first mode. In another embodiment, the first mode is a default mode of the multiplex logic after a power up of the platform. In another embodiment, the repeater is further to detect a connector type of a cable connector in response to a signal indicating connectivity of the cable connector to the IO connector. In another embodiment, the repeater to identify the connector type includes the repeater to determine whether the cable connector is a Type-C™ connector. In another embodiment, repeater is further do generate a signal to configure one of the first mode and the second mode. In another embodiment, the universal serial bus standard identifies a Bottom Up repeater configuration and a Top Down repeater configuration, the repeater further to signal one of the Bottom Up repeater configuration and the Top Down repeater configuration. In another embodiment, the universal serial bus standard includes an embedded universal serial bus standard. In another embodiment, the repeater to exchange debug information encoded according to a Boundary Scan Sideband (BSSB) interface protocol.

In another implementation, a method comprises exchanging debug information between a repeater of a platform and debug client logic of the platform via multiplex logic of the platform during a first mode of the multiplex logic, and exchanging the debug information between the repeater and a debug host coupled to the platform. A plurality of modes of the multiplex logic includes the first mode and a second mode, the first mode to provide a communication path between the repeater and the debug client logic, the second mode to provide a communication path between the repeater and a physical layer interface, wherein the repeater is compatible with a repeater architecture identified by a universal serial bus standard, and wherein the physical layer interface is compatible with an interface specification identified by the universal bus standard.

In one embodiment, the method further comprises exchanging functional data between the repeater and a physical layer interface of the platform via the multiplex logic during a second mode of the multiplex logic, wherein the physical layer interface is compatible with an interface standard identified by the universal bus standard, wherein the repeater is compatible with a repeater architecture identified by a universal serial bus standard, and wherein the physical layer interface is compatible with an interface specification identified by the universal bus standard. In another embodiment, exchanging the debug information between the repeater and a debug host includes the repeater receiving from the debug host an indication of a debug session, and the method further comprises determining, based on the indication, that the repeater is to communicate with the multiplex logic during the first mode.

In another embodiment, the first mode is a default mode of the multiplex logic after a power up of the platform. In another embodiment, the method further comprises detecting at the repeater a connector type of a cable connector in response to a signal indicating connectivity of the cable connector to the IO connector. In another embodiment, detecting the connector type of the cable connector includes the repeater determining whether the cable connector is a Type-C™ connector. In another embodiment, the method further comprises generating with the repeater a signal to configure one of the first mode and the second mode. In another embodiment, the universal serial bus standard identifies a Bottom Up repeater configuration and a Top Down repeater configuration, the method further comprises the repeater signaling one of the Bottom Up repeater configuration and the Top Down repeater configuration. In another embodiment, the universal serial bus standard includes an embedded universal serial bus standard. In another embodiment, the repeater to exchange debug information encoded according to a Boundary Scan Sideband (BSSB) interface protocol.

In another implementation, a device comprises an input/output (IO) connector to couple the device to a platform including a repeater, multiplex logic and debug client logic, and debug host logic including circuitry configured to exchange debug information with the repeater via the IO connector, wherein the repeater exchanges the debug information with the debug client logic via the multiplex logic during a first mode of the multiplex logic, wherein the repeater is compatible with a repeater architecture identified by a universal serial bus standard. In one embodiment, a plurality of modes of the multiplex logic includes the first mode and a second mode, wherein the first mode provides a communication path between the repeater and the debug client logic, wherein the second mode provides a communication path between the repeater and a physical layer interface of the platform, and wherein the physical layer interface is compatible with an interface specification identified by the universal bus standard.

In another implementation, a non-transitory computer-readable storage medium having stored thereon instructions which, when executed by one or more processing units, cause the one or more processing units to perform a method comprising exchanging debug information between a repeater of a platform and debug client logic of the platform via multiplex logic of the platform during a first mode of the multiplex logic, and exchanging the debug information between the repeater and a debug host coupled to the platform. A plurality of modes of the multiplex logic includes the first mode and a second mode, the first mode to provide a communication path between the repeater and the debug client logic, the second mode to provide a communication path between the repeater and a physical layer interface, wherein the repeater is compatible with a repeater architecture identified by a universal serial bus standard, and wherein the physical layer interface is compatible with an interface specification identified by the universal bus standard.

In one embodiment, the method further comprises exchanging functional data between the repeater and a physical layer interface of the platform via the multiplex logic during a second mode of the multiplex logic, wherein the physical layer interface is compatible with an interface standard identified by the universal bus standard, wherein the repeater is compatible with a repeater architecture identified by a universal serial bus standard, and wherein the physical layer interface is compatible with an interface specification identified by the universal bus standard. In another embodiment, exchanging the debug information between the repeater and a debug host includes the repeater receiving from the debug host an indication of a debug session, and the method further comprises determining, based on the indication, that the repeater is to communicate with the multiplex logic during the first mode.

In another embodiment, the first mode is a default mode of the multiplex logic after a power up of the platform. In another embodiment, the method further comprises detecting at the repeater a connector type of a cable connector in response to a signal indicating connectivity of the cable connector to the IO connector. In another embodiment, detecting the connector type of the cable connector includes the repeater determining whether the cable connector is a Type-C™ connector. In another embodiment, the method further comprises generating with the repeater a signal to configure one of the first mode and the second mode. In another embodiment, the universal serial bus standard identifies a Bottom Up repeater configuration and a Top Down repeater configuration, the method further comprising the repeater signaling one of the Bottom Up repeater configuration and the Top Down repeater configuration. In another embodiment, the universal serial bus standard includes an embedded universal serial bus standard. In another embodiment, the repeater is to exchange debug information encoded according to a Boundary Scan Sideband (BSSB) interface protocol.

Techniques and architectures for debugging a closed chassis device are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A repeater device comprising:
   a first interface configured to couple the repeater device to multiplex logic of a platform;
   a second interface configured to couple the repeater device to an input/output (IO) connector of the platform; and
   relay logic comprising circuitry configured to operate as a component of the platform, including the relay logic:
   to exchange debug information with debug client logic of the platform via the multiplex logic during a first mode of the multiplex logic;
   to further exchange the debug information with a debug host coupled to the platform via the IO connector; and
   to exchange functional data with a physical layer interface of the platform via the multiplex logic during a second mode of the multiplex logic;
      wherein the repeater device is compatible with a repeater architecture identified by a universal serial bus standard; and
      wherein the physical layer interface is compatible with an interface specification identified by the universal serial bus standard.

2. The repeater device of claim 1, wherein the relay logic to exchange the debug information with the debug host includes the relay logic to receive from the debug host an indication of a debug session, wherein the repeater device comprises a pattern detector to determine, based on the indication, that the repeater device is to communicate with the multiplex logic during the first mode.

3. The repeater device of claim 1, wherein the first mode is a default mode of the multiplex logic after a power up of the platform.

4. The repeater device of claim 1, wherein the repeater device is further to receive a signal indicating connectivity of a cable connector to the IO connector, and a connector type of the cable connector.

5. The repeater device of claim 4, wherein the connector type of the cable connector is a Type-C™ connector.

6. The repeater device of claim 1, wherein the repeater device is further to configure itself into one of the first mode and the second mode.

7. The repeater device of claim 1, wherein the universal serial bus standard identifies a Bottom Up repeater configuration and a Top Down repeater configuration, and wherein the repeater device is further to signal one of the Bottom Up repeater configuration and the Top Down repeater configuration.

8. The repeater device of claim 1, wherein the universal serial bus standard includes an embedded universal serial bus standard.

9. The repeater device of claim 1, wherein the repeater device is to exchange debug information encoded according to a Boundary Scan Sideband (BSSB) interface protocol.

10. A method comprising:
    exchanging debug information between a repeater of a platform and debug client logic of the platform via multiplex logic of the platform during a first mode of the multiplex logic; and
    exchanging the debug information between the repeater and a debug host coupled to the platform, wherein a plurality of modes of the multiplex logic includes the first mode and a second mode, the first mode to provide a communication path between the repeater and the debug client logic, the second mode to provide a communication path between the repeater and a physical layer interface, wherein the repeater is compatible with a repeater architecture identified by a universal serial bus standard, and wherein the physical layer interface is compatible with an interface specification identified by the universal serial bus standard.

11. The method of claim 10, further comprising:
exchanging functional data between the repeater and the physical layer interface via the multiplex logic during the second mode of the multiplex logic, wherein the physical layer interface is compatible with an interface standard identified by the universal serial bus standard.

12. The method of claim 10, wherein exchanging the debug information between the repeater and the debug host includes the repeater receiving from the debug host an indication of a debug session, the method further comprising:
determining, based on the indication, that the repeater is to communicate with the multiplex logic during the first mode.

13. The method of claim 10, wherein the first mode is a default mode of the multiplex logic after a power up of the platform.

14. The method of claim 10, further comprising receiving at the repeater a signal indicating connectivity of a cable connector to an IO connector, and a connector type of the cable connector.

15. The method of claim 14, wherein the connector type of the cable connector is a Type-C™ connector.

16. The method of claim 10, further comprising the repeater configuring itself into one of the first mode and the second mode.

17. The method of claim 10, wherein the universal serial bus standard identifies a Bottom Up repeater configuration and a Top Down repeater configuration, the method further comprising the repeater signaling one of the Bottom Up repeater configuration and the Top Down repeater configuration.

18. The method of claim 10, wherein the universal serial bus standard includes an embedded universal serial bus standard.

19. The method of claim 10, wherein the repeater is to exchange debug information encoded according to a Boundary Scan Sideband (BSSB) interface protocol.

20. A device comprising:
an input/output (IO) connector to couple the device to a platform including a repeater, multiplex logic and debug client logic;
debug host logic including circuitry configured to exchange debug information with the repeater via the IO connector, wherein the repeater exchanges the debug information with the debug client logic via the multiplex logic during a first mode of the multiplex logic, wherein the repeater is compatible with a repeater architecture identified by a universal serial bus standard.

21. The device of claim 20, wherein a plurality of modes of the multiplex logic includes the first mode and a second mode, wherein the first mode provides a communication path between the repeater and the debug client logic, wherein the second mode provides a communication path between the repeater and a physical layer interface, and wherein the physical layer interface is compatible with an interface specification identified by the universal serial bus standard.

22. A non-transitory computer-readable storage medium having stored thereon instructions which, when executed by one or more processing units, cause the one or more processing units to perform a method comprising:
exchanging debug information between a repeater of a platform and debug client logic of the platform via multiplex logic of the platform during a first mode of the multiplex logic; and
exchanging the debug information between the repeater and a debug host coupled to the platform, wherein a plurality of modes of the multiplex logic includes the first mode and a second mode, the first mode to provide a communication path between the repeater and the debug client logic, the second mode to provide a communication path between the repeater and a physical layer interface, wherein the repeater is compatible with a repeater architecture identified by a universal serial bus standard, and wherein the physical layer interface is compatible with an interface specification identified by the universal serial bus standard.

23. The computer-readable storage medium of claim 22, the method further comprising:
exchanging functional data between the repeater and the physical layer interface via the multiplex logic during the second mode of the multiplex logic, wherein the physical layer interface is compatible with an interface standard identified by the universal serial bus standard, wherein the repeater is compatible with the repeater architecture identified by a universal serial bus standard, and wherein the physical layer interface is compatible with an interface specification identified by the universal serial bus standard.

24. The computer-readable storage medium of claim 22, wherein exchanging the debug information between the repeater and a debug host includes the repeater receiving from the debug host an indication of a debug session, the method further comprising:
determining, based on the indication, that the repeater is to communicate with the multiplex logic during the first mode.

25. A system comprising:
an input/output (IO) connector to couple the system to a debug host;
a repeater coupled with the IO connector to exchange debug information with the debug host via the IO connector;
multiplex logic;
debug client logic, wherein the repeater is to further exchange the debug information with the debug client logic via the multiplex logic during a first mode of the multiplex logic;
a physical layer interface, wherein the repeater is to further exchange functional data with the physical layer interface via the multiplex logic during a second mode of the multiplex logic;
wherein the repeater is compatible with a repeater architecture identified by a universal serial bus standard, and wherein the physical layer interface is compatible with an interface specification identified by the universal serial bus standard; and
a display device coupled to the physical layer interface, the display device to display an image based on the functional data.

* * * * *